(12) United States Patent
Lauersdorf et al.

(10) Patent No.: US 7,608,655 B2
(45) Date of Patent: Oct. 27, 2009

(54) SPRAYABLE SKIN COMPOSITION AND METHOD OF APPLYING

(75) Inventors: William F. Lauersdorf, Loveland, OH (US); Kimberly A. Whitley, Largo, FL (US)

(73) Assignee: Illinois Tool Works Inc., Glenview, IL (US)

( * ) Notice: Subject to any disclaimer, the term of this patent is extended or adjusted under 35 U.S.C. 154(b) by 496 days.

(21) Appl. No.: 10/916,817

(22) Filed: Aug. 12, 2004

(65) Prior Publication Data

US 2006/0036011 A1 Feb. 16, 2006

(51) Int. Cl.
*C08K 3/34* (2006.01)
*B28B 7/38* (2006.01)

(52) U.S. Cl. .................. 524/456; 524/604; 264/255; 428/297.4

(58) Field of Classification Search .............. 524/456; 264/255
See application file for complete search history.

(56) References Cited

U.S. PATENT DOCUMENTS

| | | | |
|---|---|---|---|
| 3,959,209 A * | 5/1976 | Lake | 523/527 |
| 4,543,366 A | 9/1985 | Smith | |
| 4,568,604 A | 2/1986 | Kurtz et al. | |
| 4,609,431 A | 9/1986 | Grose et al. | |
| 4,877,476 A | 10/1989 | Wolf | |
| 5,260,368 A * | 11/1993 | Benkhoucha et al. | 524/494 |
| 5,292,580 A | 3/1994 | Dore, III | |
| 5,522,340 A | 6/1996 | Skogman | |
| 5,601,049 A | 2/1997 | Hordis et al. | |
| 5,664,518 A | 9/1997 | Lewit et al. | |
| 5,800,749 A | 9/1998 | Lewit et al. | |
| 5,891,942 A * | 4/1999 | Parish et al. | 524/284 |
| 5,904,986 A | 5/1999 | Smith | |
| 5,908,591 A | 6/1999 | Lewit et al. | |
| 6,121,358 A * | 9/2000 | Dershem et al. | 524/439 |
| 6,235,228 B1 * | 5/2001 | Nicholl et al. | 264/255 |
| 6,463,871 B1 | 10/2002 | Anderson et al. | |
| 6,726,865 B2 | 4/2004 | Mielke et al. | |
| 2002/0089076 A1 | 7/2002 | Mielke et al. | |

FOREIGN PATENT DOCUMENTS

| | | | |
|---|---|---|---|
| EP | 1405715 A1 | | 4/2004 |
| JP | 03215529 A | * | 9/1991 |
| JP | 2000086784 A | * | 3/2000 |

OTHER PUBLICATIONS

Machine translation of JP2000-086784 A, Mar. 28, 2000.*
Wypych, George. Handbook of Fillers, 2nd Edition. Toronto, ChemTec Publishing, 2000, p. 167. TP1114.W96.*
Full English-language translation of JP 03-215529 A, Sep. 20, 1991.*

* cited by examiner

*Primary Examiner*—Vickey Nerangis
(74) *Attorney, Agent, or Firm*—Dinsmore & Shohl LLP

(57) ABSTRACT

A sprayable skin composition and method of applying the skin composition is provided for use in reinforcing plastic products. The skin composition comprises a mixture of reinforcing wollastonite fibers and a synthetic resin, along with additional additives such as thixotropic agents, accelerators, stabilizers, and an air release agent. The composition is applied by spraying onto a gel coat in a mold and forms a gel within 1 to 3 minutes without the formation of air bubbles.

20 Claims, 1 Drawing Sheet

SPRAYABLE SKIN COMPOSITION AND METHOD OF APPLYING

BACKGROUND OF THE INVENTION

The present invention relates to a sprayable skin composition which may be used to reinforce plastic products, and more particularly to a composition which may be applied by spraying without the formation of air bubbles.

Many plastic products, such as boat hulls, boat bulkheads, and tub and shower stalls, are reinforced with glass fibers to provide rigidity to the product. In a typical process, glass fibers are mixed with a synthetic resin and applied as a skin layer on a gel coated surface, typically in a mold, followed by the application of one or more bulk fiberglass layers. The resin is then cured, and the product is then removed from the mold for use. However, because the mixture of glass fibers and synthetic resin is a non-homogeneous mixture which is typically applied with a chopper gun or hand-laid over the gel coat, this process often results in the formation of air bubbles between the layer of gel coat and the skin layer of glass fibers/resin. While the air bubbles may be removed by a process in which the bubbles are rolled out, such as with the use of a handheld roller or paint brush, such a step adds additional time and expense to the manufacture of the product.

U.S. Pat. No. 4,568,604 describes a method which avoids the formation of small air bubbles or voids by applying a barrier layer of a synthetic resin and filler which is applied to the gel coat before the glass fiber material is applied. However, such a barrier layer functions primarily as a filler, and has a relatively long gel time.

Therefore, there remains a need in the art for an improved skin composition and method of applying it which does not require rolling out to remove air bubbles, which gels quickly, and which provides sufficient reinforcement properties to the finished product.

SUMMARY OF THE INVENTION

The present invention meets this need by providing a sprayable skin composition and method of applying the composition which avoids the formation of air bubbles, which may be applied in quick and cost-effective manner, and which results in a product with sufficient reinforcement for a variety of uses.

According to one aspect of the present invention, a sprayable skin composition for use in reinforcing plastic products is provided comprising a mixture of reinforcing fibers and a synthetic resin, where the composition gels upon application to a surface in about 1 to about 3 minutes without the formation of air bubbles.

The reinforcing fibers preferably comprise wollastonite. Preferably, the wollastonite fibers have a mesh size of at least 100. The synthetic resin is preferably selected from the group consisting of orthophthalic polyester resins, isophthalic polyester resins, vinyl esters, and mixtures thereof. The composition preferably further comprises a styrene monomer.

The composition also preferably further comprises an accelerator. The accelerator is preferably selected from dimethyl para-toluidine, dimethyl aniline, diethyl aniline, dimethyl acetalacetamide, cobalt octoate, potassium octoate, copper naphthanate, quaternary ammonium salts, and mixtures thereof.

The composition also preferably includes additional additives such as an air release additive, a thixotropic agent, and stabilizers. Preferably, the thixotropic agent comprises a combination of an organoclay and fumed silica.

In a preferred embodiment of the invention, the sprayable skin composition comprises from about 15 to about 25% by weight wollastonite; from about 20% to about 80% of a synthetic resin; from about 0 to about 5% by weight of a thixotropic agent; from about 0 to about 5% by weight of an accelerator; and from about 0 to about 5% by weight of an air release additive. The composition preferably further includes from about 0 to about 1% by weight of a stabilizer.

The skin composition may further comprise from about 5 to about 20% by weight chopped fibers. Preferably, the fibers are glass fibers.

The present invention also provides a method of applying the sprayable skin composition which includes providing a molding surface, applying a gel coat to the molding surface, providing a skin composition comprising a mixture of reinforcing fibers and a synthetic resin, and applying the skin composition to the gel coat by spraying, wherein the skin composition gels within about 1 to about 3 minutes after application without the formation of air bubbles.

Preferably, the molding surface comprises a mold defining a mold cavity. The mold is preferably an open mold. The method also preferably includes curing the composition, after which the cured composition with the gel coat may be removed from the mold surface.

In another embodiment of the invention, the method may further comprise applying one or more bulk reinforcing layers over the skin composition to form a laminate. For example, the reinforcing layers may comprise a continuous strand mat or a fabric mat.

The cured composition provides sufficient tensile strength and flexural strength for use in a number of different plastic parts for use in boats, bathtubs, recreational vehicles, truck parts, auto accessories, and truck caps.

Accordingly it is feature of the present invention to provide a sprayable skin composition and method of applying in which the composition is applied by spraying and gels quickly without the formation of air bubbles. Other features and advantages of the invention will be apparent from the following description, the accompanying drawings, and the appended claims.

DETAILED DESCRIPTION OF THE INVENTION

Figure 1:
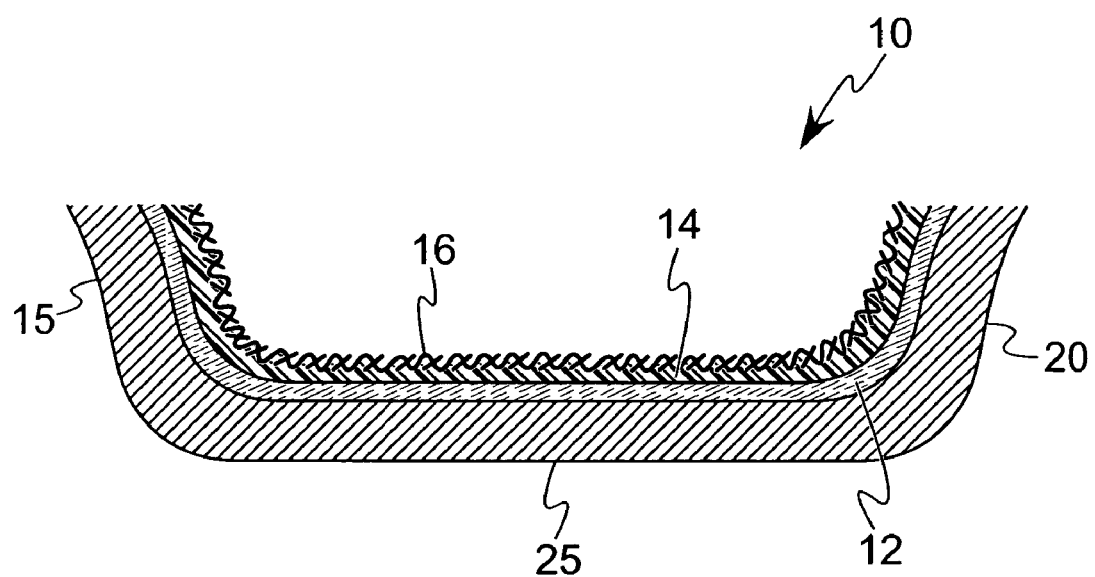
FIG. 1 is a cross-section of one embodiment of a mold used in the process of the present invention.

The sprayable skin composition and method of the present invention provides a number of advantages over prior art processes. The present invention preferably uses wollastonite as the reinforcing material, which has a mesh size greater than 100, and provides good reinforcement properties. In addition, because the wollastonite is combined with the synthetic resin prior to spraying, the composition is wet-out and homogeneous upon application. This avoids the formation of air bubbles which occur with prior art systems which utilize a non-homogeneous mixture of resin and chopped glass fibers.

The present invention also provides an advantage in that the composition forms a gel within about 1 to 3 minutes of application compared to prior art processes which have a slower gel and cure time ranging from about 8-12 minutes. The fast gel time of the skin composition of the present invention also contributes to the prevention of air bubbles, and saves labor because any additional bulk reinforcing layers, such as a continuous strand mat or fabric mat layers, may be laid down more quickly to form a finished product in less time.

The sprayable skin composition of the present invention is a preferably a combination of reinforcing fibers comprising wollastonite and a synthetic resin. It should be appreciated that while wollastonite fibers are preferred for use, other fibers such as glass fibers may also be used as long as they provide the required reinforcement properties and do not adversely affect the gel time. Typically, the composition includes between about 40 to about 60% by weight of the total composition of wollastonite.

The preferred wollastonite fibers for use in the present invention are NYGLOS® 8, commercially available from NYCO. NYGLOS is a wollastonite having a high aspect ratio of 19:1 (or about 8×150 microns). NYGLOS 8 is provided in a form which is pre-wet, so there is no need to wet out the fibers prior to use.

The synthetic resin for use in the present invention preferably comprises a mixture of polyester resins. The preferred polyester resins for use are isophthalic and orthophthalic resins. The polyester resins preferably comprise between about 50 to 80% by weight of the composition. The composition preferably further includes from about 5 to 15% by weight of a styrene monomer.

The composition preferably further includes one or more thixotropic agents which act to thicken the composition. Preferred thixotropic agents for use in the composition include organoclays such as Benathix, commercially available from Elementis Specialties, fumed silica, such as Aerosil 200, commercially available from Degussa. Preferably, a small amount of methanol is added to the composition to activate the Benathix organoclay. A small amount of surfactant, preferably, Tween 20 available from Univar, is added to activate the fumed silica. The thixotropic agent is generally present in an amount of between about 0 to about 5% by weight of the total composition. We have found that the combination of the organoclay and fumed silica with their respective activators, provides the composition with "thixotropic recovery", i.e., anti-sag properties. The combination provides better anti-sag properties than the use of either of the components alone.

The composition also includes one or more accelerators, which aid in increasing the gel time of the composition. The accelerators are generally present in an amount of between about 0 to about 5% by weight of the composition. Typical accelerators include, but are not limited to, dimethyl paratoluidine, dimethyl aniline (DMA), diethyl aniline (DEA), dimethyl acetalacetamide, cobalt octoate, potassium octoate, copper naphthanate, quaternary ammonium salts, or mixtures thereof. Preferred accelerators for use in the present invention include (15%) potassium octoate, (12%) cobalt octoate, and dimethyl aniline.

The composition preferably further includes from about 0 to 5% by weight of an air release agent, which aids in eliminating the formation of air bubbles when the composition is sprayed onto a surface. The air release agent is preferably BYK®-A 555, commercially available from BYK Chemie.

The composition also preferably includes from about 0 to 1% by weight of one or more stabilizers, which provide shelf stability to the composition. Preferred stabilizers for use in the present invention include copper naphthanate and naphtha quinone.

If desired, the skin composition may further include from about 5 to about 20% by weight chopped fibers, preferably glass fibers. The fibers may be added with a chopper gun to the composition to provide additional strength and do not require rolling out.

The composition is preferably made by mixing the components in a conventional mixer in the following order: polyester resins, thixotropic agents, cobalt and potassium accelerators, stabilizers, dimethyl aniline accelerator, styrene monomer, air release agent, and wollastonite. The skin composition is then ready for use in the method of the present invention. Referring now to FIG. 1, an open mold 10 is shown. While the skin composition may be deposited in a closed mold or open mold, it is preferably used in an open mold. The mold 10 has sidewalls 15 and 20 and bottom wall 25. Prior to depositing the gel coat and/or skin layer on the molding surface, a mold release material (not shown) is preferably applied to the molding surface to allow easy removal of the product. Mold release materials are well known and can be applied using any suitable process, as is well-known in the art.

Preferably, a gel coating 12 is provided on the bottom wall of the mold. Gel coats are well known in the art. See, for example, U.S. Pat. Nos. 6,726,865, 5,601,049, and 4,568,604, the disclosures of which are hereby incorporated by reference. The skin composition 14 is deposited on the bottom wall 25 of the mold 10. The composition 14 is preferably deposited by spraying onto the surface of the gel coat 12. The composition is preferably sprayed using a conventional spray gun. Preferred for use in the present invention is a spray gun commercially available from Magnum.

After the composition is sprayed onto the molding surface, the composition begins to gel within 1 to 3 minutes.

The composition is then cured to a point sufficient to be removed from the mold. Typically, curing takes place at ambient temperature in the mold. After the skin layer has cured, the layer has a thickness in the range of about 0.038 inches.

Laminates containing the skin composition may also be formed by applying additional bulk reinforcing layers over the skin layer to form a laminate which is strong and lightweight. For example, a continuous strand mat or fabric mat 16 may be applied over the skin layer to form a laminate prior to curing.

The skin composition of the present invention is preferably used in non-stress areas of parts such as dash boards, instrument panels, hatch covers, wall framing, and the like, which are prone to develop voids or bubbles due to their small size.

In order that the invention may be more readily understood, reference is made to the following examples of compositions within the scope of the present invention, which examples are intended to be illustrative of the invention, but are not intended to be limiting in scope.

EXAMPLE 1

A sprayable skin composition was formed in accordance with the present invention with the following formulation:

| Material | % by Weight |
|---|---|
| isophthalic polyester resin | 33% |
| orthophthalic polyester resin | 33% |
| surfactant[1] | 0.14% |
| organoclay thixotropic agent[2] | 1.45% |
| methanol | 0.75% |
| fumed silica thixotropic agent[3] | 0.8% |
| 12% cobalt octoate | 0.14% |
| 15% potassium octoate | 0.12% |
| 8% copper naphthanate | 0.003% |
| 1,4 naphtha quinone (10% solution) | 0.05% |
| dimethyl aniline | 0.05% |
| styrene monomer | 9.3% |
| air release agent[4] | 0.22% |

-continued

| Material | % by Weight |
|---|---|
| wollastonite[5] | 20.64% |

[1]Tween 20 from Univar
[2]Benathix from Elementis Specialties
[3]Aerosil 200 from Degussa
[4]Byk-A-555 from Byk Chemie
[5]Nyglos 8 from NYCO The composition was sprayed into a series of molds containing a gel coat, followed by the application of a continuous strand mat (about 1½ ounces) and a fabric mat (about 4 ounces). After curing, the resulting laminates were tested for various mechanical properties, using the average of 5-6 specimens. All load and strain measuring devices were calibrated according to ASTM E 4 and ASTM E 83.

The results are shown below in Table 1.

TABLE 1

| Tensile Strength/Modulus (ASTM D 638) | |
|---|---|
| Tensile Strength | 4,088 psi |
| Tensile Modulus | 0.7698 Mpsi |
| Elongation at break | 0.96% |
| Flexural Strength/Modulus (ASTM D 790) | |
| Flexural Strength | 19,630 psi |
| Flexural Modulus | 0.7853 Mpsi |
| Load per inch width | 178 lb/in. |
| EI (stiffness) | 875 in$^2$-lb. |
| Bending moment | 169 in-lbs. |
| Shear | 90 lb. |

While certain representative embodiments and details have been shown for purposes of illustrating the invention, it will be apparent to those skilled in the art that various changes in the compositions and methods disclosed herein may be made without departing from the scope of the invention, which is defined in the appended claims.

What is claimed is:

1. A sprayable skin composition for use in reinforcing plastic products comprising:
    about 15% to about 25% by weight of said sprayable skin composition of wollastonite reinforcing fibers;
    about 50% to about 80% by weight of said sprayable skin composition synthetic polyester resin wherein the synthetic polyester resin is orthophthalic polyester resins, isophthalic polyester resins, or mixtures thereof; and
    about 5% to about 15% by weight of said sprayable skin composition of a styrene monomer;
    wherein said sprayable skin composition gels in about 1 to about 3 minutes at ambient temperature after being sprayed onto a gel coated surface without the formation of air bubbles.

2. The sprayable skin composition of claim 1 wherein said wollastonite has a mesh size of at least 100.

3. The sprayable skin composition of claim 1 wherein said sprayable skin composition further comprises an accelerator.

4. The sprayable skin composition of claim 3 wherein said accelerator is selected from dimethyl para-toluidine, dimethyl aniline, diethyl aniline, dimethyl acetalacetamide, cobalt octoate, potassium octoate, copper naphthanate, quaternary ammonium salts, or mixtures thereof.

5. The sprayable skin composition of claim 1 further comprising an air release additive.

6. The sprayable skin composition of claim 1 further comprising a thixotropic agent.

7. The sprayable skin composition of claim 6 wherein said thixotropic agent comprises a combination of an organoclay and fumed silica.

8. The sprayable skin composition of claim 1 further comprising a stabilizer.

9. The sprayable skin composition of claim 1 further comprising from about 5 to about 20% by weight chopped fibers.

10. A sprayable skin composition for reinforcing products comprising:
    from about 15 to about 25% by weight of said sprayable skin composition of wollastonite;
    from about 50% to about 80% by weight of said sprayable skin composition of a synthetic polyester resin wherein the synthetic polyester resin is orthophthalic polyester resins, isophthalic polyester resins, or mixtures thereof;
    from about 5 to about 15% by weight of said sprayable skin composition of a styrene monomer;
    from about 0 to about 5% by weight of said sprayable skin composition of a thixotropic agent;
    from about 0 to about 5% by weight of said sprayable skin composition of an accelerator; and
    from about 0 to about 5% by weight of said sprayable skin composition of an air release additive;
    wherein said sprayable skin composition gels in about 1 to about 3 minutes at ambient temperature after being sprayed onto a gel coated surface without the formation of air bubbles.

11. The sprayable skin composition of claim 10 wherein said accelerator is selected from dimethyl para-toluidine, dimethyl aniline, diethyl aniline, dimethyl acetalacetamide, cobalt octoate, potassium octoate, copper naphthanate, quaternary ammonium salts, or mixtures thereof.

12. The sprayable skin composition of claim 10 further comprising from about 0 to about 1% by weight of said sprayable skin composition of a stabilizer.

13. The sprayable skin composition of claim 10 further comprising from about 5 to about 20% by weight of said sprayable skin composition chopped fibers.

14. A method of applying a sprayable skin composition comprising:
    providing a molding surface;
    applying a gel coat to said molding surface;
    providing a sprayable skin composition comprising about 15% to about 25% by weight of said sprayable skin composition wollastonite reinforcing fibers, about 50% to about 80% by weight of said sprayable skin composition synthetic polyester resin wherein the synthetic polyester resin is orthophthalic polyester resins, isophthalic polyester resins, or mixtures thereof, and about 5% to about 15% by weight of said sprayable skin composition of a styrene monomer;
    applying said sprayable skin composition to said gel coat by spraying, wherein said sprayable skin composition gels within about 1 to about 3 minutes at ambient temperature after application without the formation of air bubbles.

15. The method of claim 14 wherein said molding surface comprises a mold defining a mold cavity.

16. The method of claim 15 wherein said mold is an open mold.

17. The method of claim 14 further comprising allowing said sprayable skin composition to cure.

18. The method of claim 17 further comprising removing the cured sprayable skin composition with said gel coat from said molding surface.

19. The method of claim 14 further comprising applying one or more bulk reinforcing layers over said sprayable skin composition.

20. The product made by the method of claim 14.

* * * * *

UNITED STATES PATENT AND TRADEMARK OFFICE
CERTIFICATE OF CORRECTION

PATENT NO.      : 7,608,655 B2                                        Page 1 of 1
APPLICATION NO. : 10/916817
DATED           : October 27, 2009
INVENTOR(S)     : Lauersdorf et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 965 days.

Signed and Sealed this

Twelfth Day of October, 2010

David J. Kappos
*Director of the United States Patent and Trademark Office*